United States Patent [19]

Breslau et al.

[11] 4,416,528
[45] Nov. 22, 1983

[54] CAMERA LENS ACCESSORY MOUNTING CONSTRUCTION

[75] Inventors: Steven M. Breslau, Evanston, Ill.; M. Gary Grossman, Fort Lee, N.J.

[73] Assignee: Sima Products Corporation, Chicago, Ill.

[21] Appl. No.: 389,220

[22] Filed: Jun. 17, 1982

[51] Int. Cl.³ .................... G03B 11/06; G02B 7/00
[52] U.S. Cl. ........................... 354/296; 350/318
[58] Field of Search ............... 354/122, 295, 296; 350/587, 318

[56] References Cited

U.S. PATENT DOCUMENTS

| | | | |
|---|---|---|---|
| 1,971,434 | 8/1934 | Trautmann | 350/318 X |
| 2,504,255 | 4/1950 | Lanauzie | 350/318 X |
| 3,719,132 | 3/1973 | Urano | 350/318 X |
| 3,796,477 | 3/1974 | Geraci | 350/587 |
| 3,896,463 | 7/1975 | Laskey | 354/295 X |
| 4,124,859 | 11/1978 | Huber | 354/296 |
| 4,291,962 | 9/1981 | Jackson | 354/122 |

*Primary Examiner*—John Gonzales
*Attorney, Agent, or Firm*—Silverman, Cass & Singer, Ltd.

[57] ABSTRACT

A camera lens accessory and mounting ring construction for positioning and locking lens accessories, such as filter or aperture discs, at the front of the lens. The discs include a respective notch formed along the circumference thereof and the mounting ring has a pair of oppositely-facing lugs formed on the inner-facing circumference thereof. The discs are mountable to the end of the lens by slipping one or more selected discs under one of the lugs, lining up the notch on the discs to be in registry with the other of the lugs and slipping the discs under the latter lug. The discs are then rotated to move the notch out of registry with the lugs such that the discs are retained behind the two lugs, and the mounting ring is threadly engaged over the lens barrel to secure the discs upon the end of the lens.

8 Claims, 7 Drawing Figures

U.S. Patent    Nov. 22, 1983    Sheet 1 of 2    4,416,528
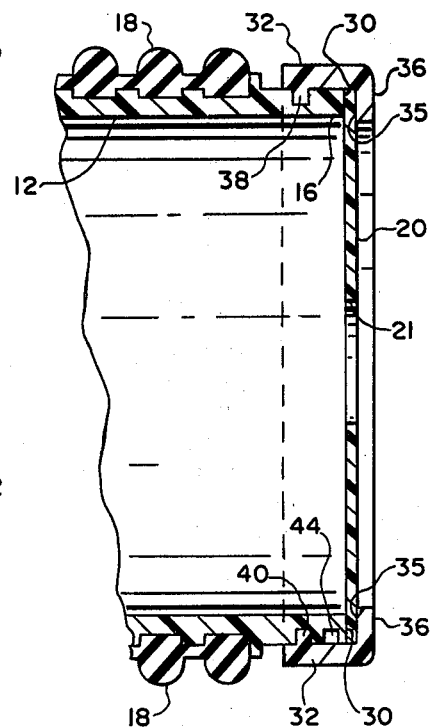
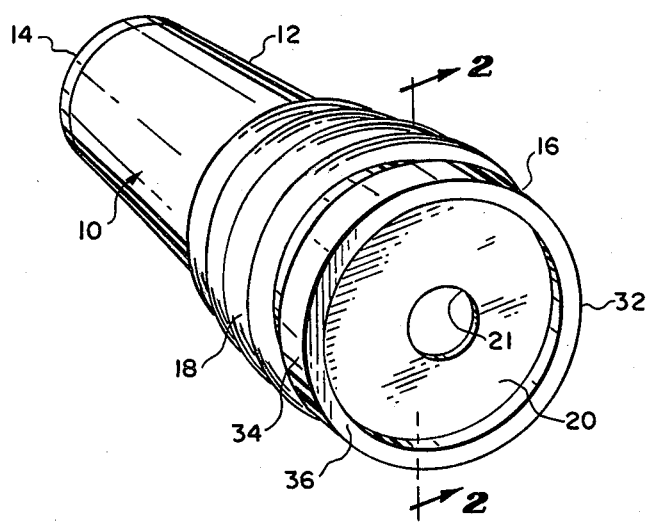
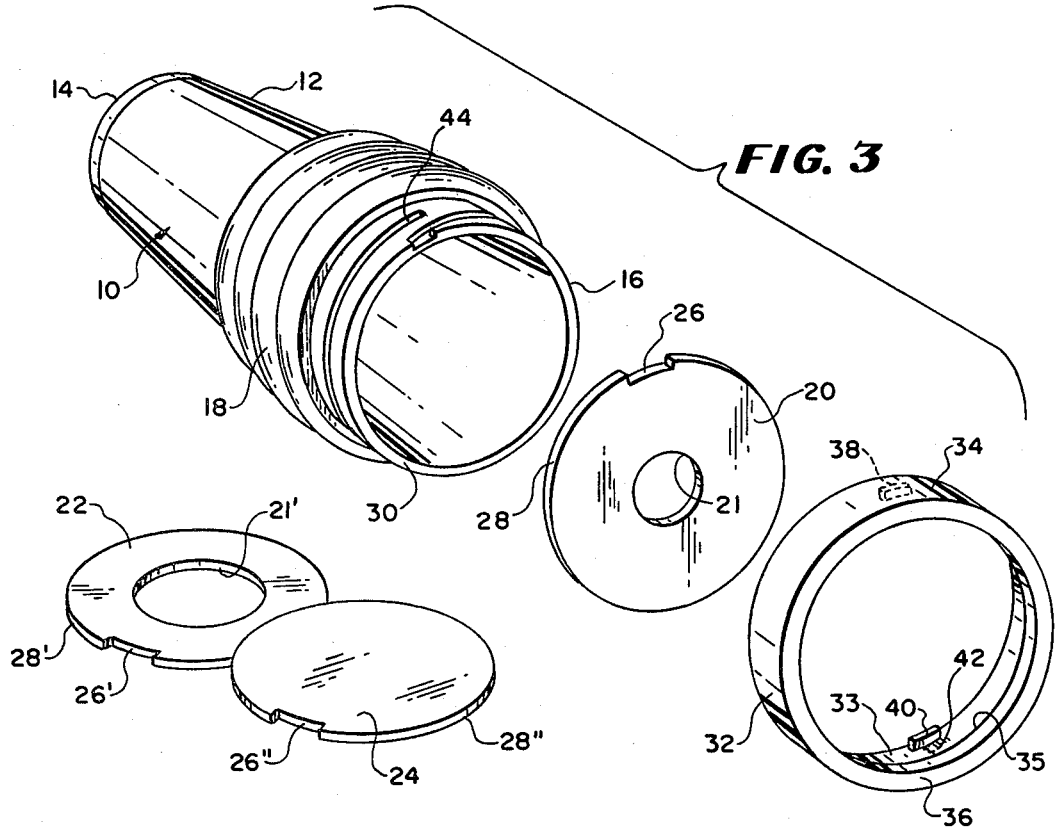

4,416,528

CAMERA LENS ACCESSORY MOUNTING CONSTRUCTION

BACKGROUND OF THE INVENTION

1. Field of the Invention

This invention relates generally to camera lenses, and more particularly, to a novel mounting ring and lens accessory construction for positioning and locking lens accessories at the front of the lens.

2. Description of the Prior Art

It often is desirable in the use of the conventional camera lenses to attach one or more accessory discs at the front of the lens to achieve special photographic effects. For example, selected accessory aperture discs may be positioned at the front of the lens to reduce the amount of light which reaches the film in bright light conditions and to give a sharper image and increase the depth of field. Also, in order to compensate for bright light conditions and when using relatively fast films, it may be desirable to use a selected filter disc positioned at the front of the lens. On occasion, it may even be desirable to use both an aperture disc and a filter disc concurrently mounted on the lens to achieve a desired effect.

Varying photographic conditions and films dictate which selected one or more of any of a wide variety of aperture, filter or other special effect discs should be used by mounting the same to the front of the camera lens. Therefore, it is necessary that such discs be removably mountable in a quick and convenient manner to permit the user to change accessory with a minimum of effort. It also is necessary that the accessory, once mounted, be firmly and securely positioned on the lens so as not to be unintentionally dislodged.

Various camera lens accessory mounting devices of the type with which the present invention is concerned are known in the art. For example, the following patents disclose attaching means for camera lens accessories and for mounting photo vignetting devices to camera lenses:

| U.S. Pat. Nos. | |
| --- | --- |
| 3,122,077 | 3,940,775 |
| 3,527,151 | 4,013,347 |
| 3,761,162 | 4,107,716 |
| 3,774,992 | 4,124,859 |
| 3,879,741 | 4,126,878 |
| 3,885,242 | 4,213,686 |
| French Patent 1,185,926 | |

The attaching members disclosed in said patents are of relatively complex and special construction which are cumbersome for the user to handle. The present invention provides an accessory mounting member which is of relatively uncomplicated construction and yet achieves the desired advantages of permitting quick and convenient mounting and de-mounting of lens accessories to the front end of the lens which are securely positioned thereon when so mounted.

SUMMARY OF THE INVENTION

The invention is characterized by an accessory disc and mounting ring adapted for engagement upon the front end of the barrel of a camera lens. The ring has a pair of oppositely-facing lugs formed upon the inner-facing circumference thereof, which lugs extend radially within the ring and are engageable with a thread track formed in the front end of the lens barrel to permit the ring to be threadedly engaged on the barrel. One or more accessory discs each having a notch formed on the circumference thereof is mountable to the end of the lens by slipping the disc under one of the lugs, lining up the notch in the disc to be in registry with the other of the lugs, and slipping the disc under the latter lug. Thereafter, the disc is rotated so that the notch is moved out of registry with the lugs such that the disc is retained behind the two lugs against a flange on the ring, and the mounting ring is threadly engaged over the lens barrel by engagement of the lugs in the thread track and clockwise rotation of the ring to secure the disc or discs upon the end of the lens behind the flange of the mounting ring.

Upon positioning of the disc or discs on the front end of the lens barrel, the same are firmly and securely positioned by reason of the force exerted by the flange of the mounting ring upon the discs against the end of the barrel. The disc or discs conveniently are removable and replaceable from their mounting by counter-clockwise rotation of the ring to unscrew the same from the lens barrel and removing the discs by slipping them out from under the lugs in the reverse manner from that described above for mounting the discs.

Various objects and advantages of the invention will become apparent in accordance with the above and foregoing disclosure in which a preferred embodiment is described in detail in the specification and illustrated in the accompanying drawings. It is contemplated that minor variations may occur to the skilled artisan without departing from the scope or sacrificing any of the advantages of the invention.

BRIEF DESCRIPTION OF THE DRAWINGS

FIG. 1 is a perspective view of a camera lens with the accessory and mounting ring construction of the invention positioned thereon;

FIG. 2 is a sectional view taken along the line 2—2 of FIG. 1 in the direction indicated generally;

FIG. 3 is an exploded perspective view showing the camera lens and accessory mounting ring construction of FIG. 1;

DESCRIPTION OF THE PREFERRED EMBODIMENT

Figure 4:
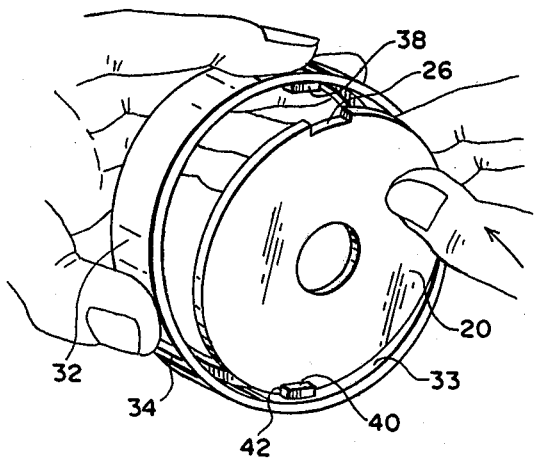
FIG. 4 is a perspective view of one accessory disc and the mounting ring of the invention illustrating the manner in which the accessory disc is positioned within the mounting ring.

The drawings illustrate a photographic camera lens 10 of conventional construction including a barrel 12 with a rear end 14 adapted to be mounted on a camera (not shown) by conventional means such as T-mount or threaded connection. The front end 16 of lens barrel 12 may be formed with a circumferential gripping surface 18 to enable the user to manipulate the lens for the purpose of focusing, for example. The gripping surface 18 may be of any design or configuration and is shown in one manner in the drawing for purposes of illustration only and does not form a part of the invention.

In use of the camera lens 10, it may be desirable to attach one or more accessory members at the front end 16 to achieve varient or special photographic effects with the lens. There is illustrated in the drawings three such accessory members 20, 22 and 24 which are so useable with the lens 10. For purposes of illustration, two aperture members 20, 22 are shown with different sized apertures, 21, 21' which may selectively be positioned at the front 16 of the lens to reduce the amount of light which reaches the film in bright light conditions. There also is shown a filter accessory 24 which may be used alone or together with an aperture member 20, 22 to compensate for bright light conditions and when using relatively fast films with the camera on which the lens 10 is mounted.

Accessory members 20, 22 and 24 preferably are of generally disc-shaped configuration, each having a notch 26, 26', and 26" formed on the perimeter or circumferential edges 28, 28' and 28", respectively. The diameter of each accessory disc 20, 22, 24 is substantially the same as that of the front end 16 of lens 10 so that when a disc is positioned upon the front end of the lens in the manner described below, it will rest against the front end surface 30 of the lens as illustrated in FIG. 2.

A mounting ring 32 with a circumferential band portion 34 and an integrally formed, radially extending flange 36 is provided for securing one or more accessory discs to the front end 16 of the lens. The mounting ring 32 is provided with a pair of oppositely-facing lugs 38, 40 on the inner facing circumferential surface 33 of the band part 34. The lugs 38, 40 extend radially within the ring and each defines a space 42 (FIG. 3) between said lugs and the inner facing surface 35 of flange 36. The space 42 is of a dimension sufficiently great to accommodate therein one or two of the accessory discs 20, 22 or 24 to permit positioning of a disc or discs within the ring in the space 42 between the lugs 38, 40 and the inner facing surfaces 35 of flange 36.

Front end 16 of lens 10 is formed with a thread track 44 which is adapted to be engaged by lugs 38, 40 to permit threaded engagement of the ring 32 upon the lens barrel 10 by positioning the lugs 38, 40 within the track 44 and rotating the ring 32 clockwise.

Figure 5:
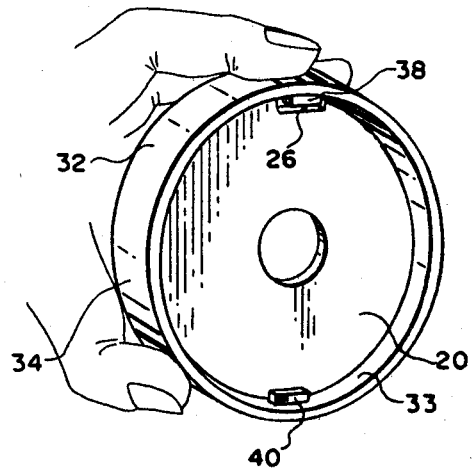
FIG. 5 is a perspective view similar to FIG. 4 showing the accessory disc moved to be positioned within the mounting ring.
Figure 6:
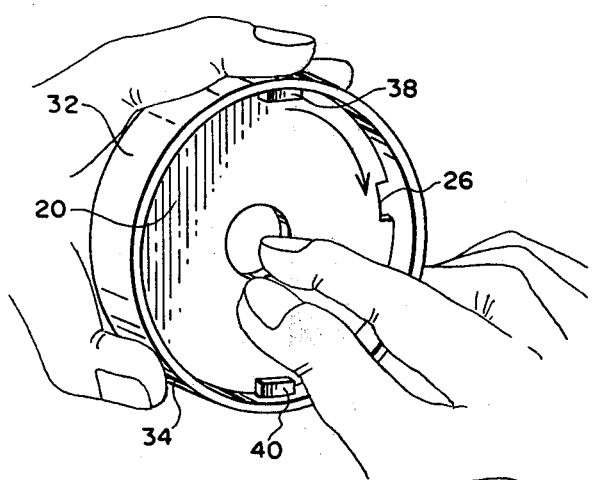
FIG. 6 is a perspective view similar to FIGS. 4 and 5 illustrating a further step in positioning the accessory disc within the ring.
Figure 7:
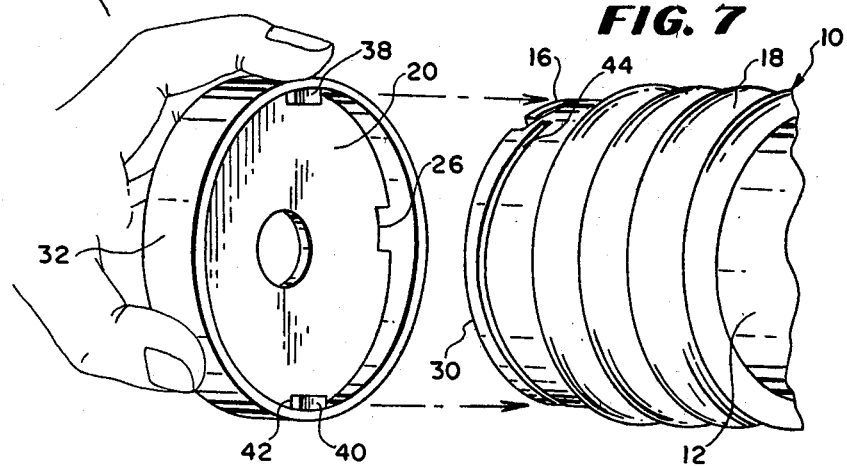
FIG. 7 is a perspective view illustrating the manner in which the mounting ring with accessory disc positioned therein is attached to the front of a camera lens.

The accessory discs 20, 22, 24 are mountable on the front end 16 of lens 10 in the manner illustrated in FIG. 4 through FIG. 7. One or two accessory discs 20, 22, 24 may be positioned behind lug 40 on the inner facing surface 33 of band 34 within the space 42. As illustrated, a single disc 20 is slipped behind the lug 40 and rotated so that notch 26 is lined up to be in registry with lug 38. Disc 20 then is pivoted about the point proximate lug 40 so that it is slipped behind lug 38 by moving notch 26 past the lug 38 as shown in FIG. 5. In this position, disc 20 is positioned against the inner facing surface 35 of flange 36 (see FIG. 2). Disc 20 thereupon is rotated, as shown in FIG. 6, so that notch 26 is moved out of registry with the lugs 38, 40 such that the disc is retained behind the two lugs against flange 36. Next, ring 32 with disc 20 positioned within space 42 is moved to the end 16 of lens 10 so that the lugs 38, 40 engage thread track 44. Ring 32 thereupon is threadly engaged over end 16 by rotating the ring clockwise to secure the ring on the end of the lens with disc 20 pressed against front end surface 30 by the force of flange 36 exerted against the disc 20.

Upon positioning of one or two of the discs 20, 22, 24 on the front end 16 of the lens 10, the same are firmly and securely positioned between surfaces 30 and 35 (see FIG. 2) by reason of the force exerted by the flange 36. The disc or discs may be removed from their mounting by counter-clockwise rotation of ring 32 to disengage the same from the lens barrel. Thereafter, the discs may be removed from within the mounting ring 32 by rotating same such that the notch 26 is in registry with a lug 38, 40 to permit the disc to be slipped out from under the lugs in the reverse manner from that described above for mounting the discs.

Minor variations in the structure and other variations in the arrangement and size of the various parts may occur to those skilled in the art without departing from the spirit or circumventing the scope of the invention as set forth in the appended claims.

We claim:

1. A camera lens accessory and mounting device for positioning and locking one or more accessories at a front end of the lens comprising, at least one accessory having a perimeter edge, a notch formed in said accessory along said edge, a mounting ring, said ring including a pair of oppositely-facing lugs extending radially within the ring from the inner-facing circumference thereof, said accessory being positionable within said ring to be retained therein by said lugs, and said ring with accessory positioned therein being mountable to said front end of the lens to retain the accessory thereon.

2. A device as claimed in claim 1 in which the accessory is of generally disc-shaped configuration and the notch is formed in the circumference thereof.

3. A device as claimed in claim 2 in which the diameter of the accessory is substantially the same as the front end of the lens.

4. A device as claimed in claim 1 in which the lens has a thread track formed about the front end and the ring is mountable upon the lens by engaging the lugs in the thread track and rotating the ring with respect to the lens.

5. A device as claimed in claim 4 in which the ring includes a circumferential band and a flange extending radially from said band.

6. A device as claimed in claim 5 in which said lugs define a space on the inner-facing surface of said band between said lugs and said flange, said space being of a dimension sufficiently great to accommodate therein one or two of said accessories.

7. A device as claimed in claim 6 in which said accessory is positioned within the ring by insertion within said space between one lug and the flange and thereafter rotation of the accessory to line up the notch with the other of the lugs to be in registry therewith and pivoting the accessory about the point proximate said one lug to slip the accessory past the other lug so that the accessory rests against the flange.

8. A device as claimed in claim 7 in which the accessory is pressed against the front end of the lens by the force of the flange when the ring is mounted on the lens.

* * * * *